UNITED STATES PATENT OFFICE.

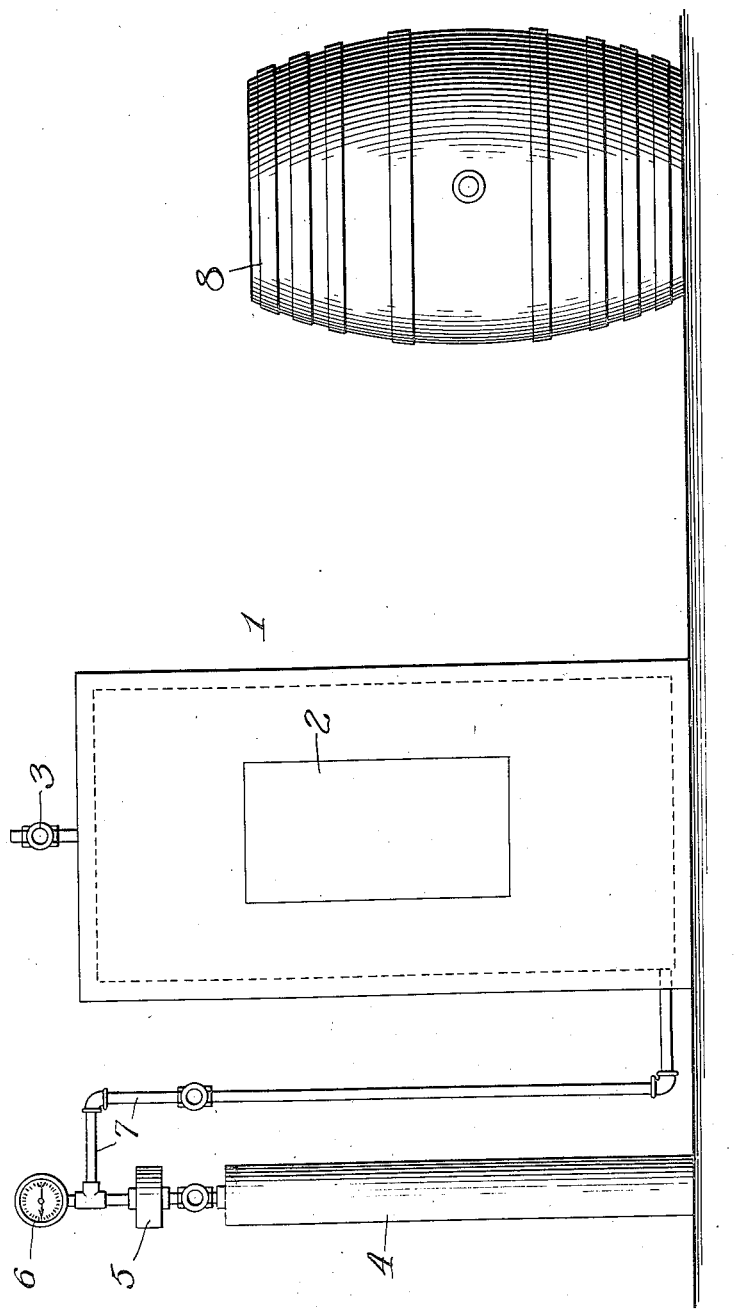

CHARLES B. TRESCOTT, OF INDIANAPOLIS, INDIANA, ASSIGNOR TO HENRY L. MILLIS, OF CHICAGO, ILLINOIS.

PROCESS OF CURING MEAT.

1,134,299.  Specification of Letters Patent.  Patented Apr. 6, 1915.

Application filed November 18, 1913. Serial No. 801,674.

*To all whom it may concern:*

Be it known that I, CHARLES B. TRESCOTT, a citizen of the United States, residing at Indianapolis, in the county of Marion and State of Indiana, have invented a new and useful Improvement in Processes of Curing Meat, of which the following is a specification.

My present invention, which is in the nature of an improvement on the process of curing meat set forth in Letters Patent of the United States, No. 1,016,656 granted to me February 6, 1912, relates to an improvement in curing salted meats, with the primary object of effecting a mild cure thereof while employing a strong pickle.

While my present process is applicable with advantage to any of various kinds of salt meats, it will suffice to explain herein its application to hams and bacon, more particularly, and with reference to the usual practice of curing the same, which consists in holding them immersed in pickle until they are impregnated throughout the meat with salt and thoroughly cured. The pickle may be of any desired strength. Full strength, or 100% pickle, is composed of about 2.6 lbs. of salt to a gallon of water and contains more usually a small proportion of saltpeter for its coloring and preservative effect on the meat, and sugar in suitable proportion to modify the sharpness of the salt. For ordinary curing the strength of the pickle is reduced to about 80% to 70%, though rarely much below 70%, since a lower percentage of salt than about 1¾ lbs. to a gallon of water produces a mild pickle, which often acts too slowly to preserve the meat, meaning to prevent souring or even putrification thereof; and a strong pickle renders the meats unpalatably salt. I find that by only partially salting the meats in a comparatively strong pickle, of a strength, depending upon the thickness of the meat, of, say, 65% to 95%, or thereabout—meaning thereby, causing the salt to penetrate the meat only partway, as to the extent of one-third to one-half of its thickness—then taking it out of the pickle and immersing it in carbonic acid gas under close confinement, the supply of the salt in the meat will gradually distribute itself throughout the entire thickness thereof, thereby reducing its proportion to the quantity of the meat and effecting a mild and thoroughly uniform cure. This cure takes place while the meat is becoming impregnated with the carbonic acid gas, which supplants the air in the meat, or renders harmless any air that may remain therein, and coöperates with the salt to preserve the meat permanently, notwithstanding the mildness of its cure by being impregnated with a smaller proportion of salt, against spoiling when exposed to the atmosphere.

The accompanying drawing illustrates, by way of a diagrammatic representation, apparatus in side elevation for the practice of my improved process.

The apparatus shown in the drawing comprises a tank or chamber 1 provided with a removable door 2, which is thoroughly sealed in the use of the tank. The tank is provided with a valve 3 on its upper end adapted to be opened for the escape of air. A drum 4 containing the supply of carbonic acid gas, and which is equipped with a reducing valve 5 and a pressure gage 6, is connected by a valved-pipe 7 with the chamber 1 near its lower end. At 8 is shown a vat for containing the pickle in which the meat to be cured by my process is immersed.

When hams have been immersed in the pickle for a suitable length of time, they are removed from the vat 8 and introduced into the chamber 1, the door of which is thereupon hermetically sealed; and carbonic acid gas from the drum 4 is then admitted into the chamber until the latter is filled with the gas. In this chamber the salt in each ham gradually distributes itself throughout the meat, forming the supply for permeating the entire body thereof, so that if the quantity of salt taken from the pickle penetrates only, say, to one-half the thickness of the meat, one-half of that quantity of the salt will permeate the remainder of the thickness, thereby mildly curing the ham. While the salt-permeation is proceeding, the carbonic acid gas impregnates the meat and coöperates with the salt in the preservative effect of its curing property.

In this connection, it will be useful to state the results of some of my practical work in curing hams by my present process: A 20 lb. ham immersed in a 90% pickle for nearly twenty days, took up about 18% of the salt, which penetrated the meat to about one-third the thickness thereof. This ham, subjected in the chamber 1 to the gradual further permeation of the salt and the action of the carbonic acid gas for a period of sixty days was found to have undergone a thorough and uniform mild cure. A 12 lb. ham immersed in a 75% pickle for the same number of days took up about 16% of the salt, which penetrated to the same depth as that hereinbefore stated and was cured with the same result by confinement in the chamber 1 for a period of thirty days; and an 8 lb. ham, of the so-called "picnic" variety, which is a shoulder, immersed in a 68% to 70% pickle for nearly twenty days, took up about 15% of the salt and was held in the chamber 1 for a period of twenty days, with the same result. The foregoing tests were made employing about 5½ gallons of pickle to 100 lbs. of meat.

It is a peculiar advantage of my improved process that there is no loss of meats, when originally sound, by imperfect curing which renders the meats liable to spoil by souring or becoming tainted; and meats cured by my process keep permanently in perfectly sweet condition, notwithstanding the mildness of the cure.

What I claim as new and desire to secure by Letters Patent is—

1. The process of curing meat, which consists in first pickling it in brine to impregnate it with salt throughout a portion only of its thickness and thereby retain its natural juices, and thereupon continuing the curing action of the salt throughout the remainder of the thickness of the meat while impregnating the latter with carbonic acid gas.

2. The process of curing meat, which consists in first pickling it in a comparatively strong brine-pickle until the salt of the pickle has penetrated through only a portion of the thickness of the meat and while retaining therein its natural juices, then removing the meat from the pickle and immersing it in carbonic acid gas under confinement and holding it thus immersed until the salt has permeated the remainder of the thickness of the meat and the carbonic acid gas has penetrated the same.

CHARLES B. TRESCOTT.

In presence of—
GERALDINE NEVILLE,
OTTILIE C. AVISUS.